No. 895,791. PATENTED AUG. 11, 1908.
G. D. ROLLINS.
METALLIC PACKING.
APPLICATION FILED OCT. 14, 1907.
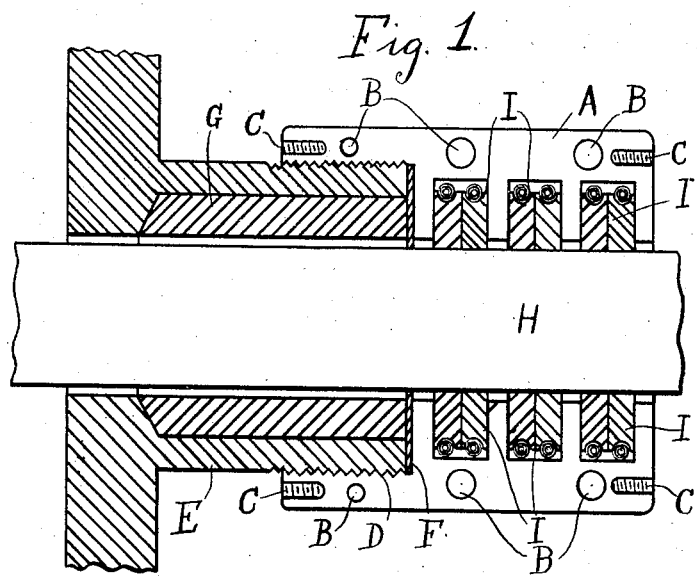
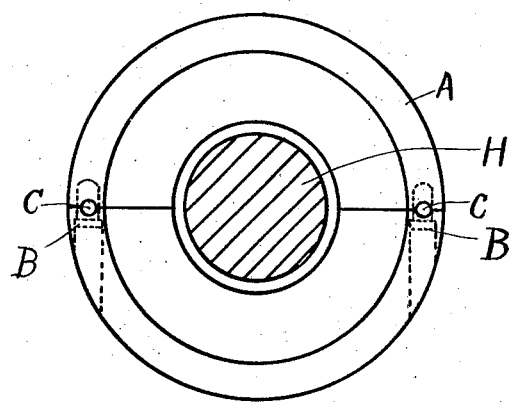
WITNESSES
INVENTOR
George D. Rollins
BY
ATTORNEY

UNITED STATES PATENT OFFICE.

GEORGE D. ROLLINS, OF PHILADELPHIA, PENNSYLVANIA.

METALLIC PACKING.

No. 895,791.   Specification of Letters Patent.   Patented Aug. 11, 1908.

Application filed October 14, 1907. Serial No. 397,247.

*To all whom it may concern:*

Be it known that I, GEORGE D. ROLLINS, a citizen of the United States, residing at Philadelphia, county of Philadelphia, and State of Pennsylvania, have invented a certain new and useful Improvement in Metallic Packing, of which the following is a specification.

My invention relates to a new and useful improvement in metallic packing, and has for its object to provide a simple and effective construction by which the case of the packing may be screwed into place upon the ordinary stuffing box of the piston rod or valve stem of an engine, pump or the like, adapting the packing to a class of engines to which it would otherwise be difficult to secure it, and a further object of my invention is to provide a filling for the surplus space in the stuffing box so as to avoid the accumulation of water from the condensing of steam.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a longitudinal section of a portion of a steam chest or cylinder showing the stuffing box and my improved packing screwed thereon. Fig. 2, an end view of the packing looking upward.

In carrying out my invention as here embodied, A represents the casing, which is made in two sections split longitudinally, and secured together by means of the screws B, and prevented from longitudinal movement by the screws C, which are threaded in both of these sections. The inner end of this casing is recessed and threaded, as indicated at D, in order that it may be screwed upon the threaded end of the stuffing box E, and F is a compressible disk interposed between the outer end of the stuffing box and the inner wall of the casing, so that when said casing is screwed into place this disk will form a steam tight joint, preventing the escape of steam between the threads of the casing and stuffing box.

G is a plug fitted into the stuffing box so as to fill the surplus space therein and prevent the accumulation of water in the pocket, which would otherwise be formed.

In practice, the gland nut is removed from the end of the stuffing box and the sections of my improved packing placed around the rod H, and after these sections are secured together by the screws B the casing is then threaded on to the end of the stuffing box, as clearly shown in Fig. 1, thus avoiding the necessity of using stud bolts or other means for securing the casing in place. This is especially advantageous in certain classes of engines where the stuffing box is too small in diameter to receive the casing of the packing.

The casing has formed therein a series of grooves for the reception of the packing rings I.

Having thus fully described my invention, what I claim as new and useful, is—

1. The herein described combination of a stuffing box having external threads thereon, a casing made in two sections split longitudinally, said casing having a recess, internal threads formed in the wall of said recess adapted to run upon the external threads of the stuffing box, means for securing the sections of the casing together and packing rings fitted within grooves formed in the casing, as specified.

2. The herein described combination of a stuffing box having external threads thereon, a casing made in two sections split longitudinally, said casing having a recess, internal threads formed in the walls of said recess adapted to run upon the external threads of the stuffing box, means for securing the sections of the casing together, packing rings fitted within grooves formed in the casing and a disk for making a steam tight joint between the casing and the end of the stuffing box, as specified.

3. The herein described combination of a stuffing box having external threads thereon, a casing made in two sections split longitudinally, said casing having a recess, internal threads formed in the walls of said recess adapted to run upon the external threads of the stuffing box, means for securing the sections of the casing together, packing rings fitted with grooves formed in the casing, a disk for making a steam tight joint between the casing and the end of the stuffing box and a filling plug fitted within the stuffing box to prevent the accumulation of water in said stuffing box, as specified.

In testimony whereof, I have hereunto affixed my signature in the presence of two subscribing witnesses.

GEORGE D. ROLLINS.

Witnesses:
S. M. GALLAGHER,
E. N. SCHOFIELD.